United States Patent Office 3,189,615
Patented June 15, 1965

3,189,615
2-ARYL-4,5-ARYLO-1,2,3-TRIAZOLE
Hansjorg Heller, Basel, Ernst Keller, Basel-Land, and Hermann Gysling, Basel, Switzerland, and Fritz Mindermann, Baden, Germany, assignors to J. R. Geigy, A.-G., Basel, Switzerland, a Swiss firm
No Drawing. Original application Dec. 10, 1957, Ser. No. 701,719, now Patent No. 3,004,896, dated Oct. 17, 1961. Divided and this application Oct. 3, 1961, Ser. No. 142,537
Claims priority, application Switzerland, Dec. 14, 1956, 40,674/56
8 Claims. (Cl. 260—308)

This appliaction is a division of copending application Serial No. 701,719, filed December 10, 1957, now U.S. Patent 3,004,896, entitled Ultra-Violet Light-Absorbing Composition of Matter.

Many synthetic materials used in technics as well as also some substances of biological importance such as certain foodstuffs for example, are disadvantageously altered by the effect of light. It is known that this is due to a considerable extent to the ultra-violet rays.

It has been found that organic compounds of the formula:

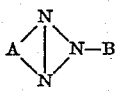

are effective non-actinic agents. In this formula the triazole ring is written in the conventional manner but the arrangement of the valences at the nitrogen atom is left undetermined. In this formula: A represents a phenylene radical bound by two neighbouring carbon atoms to two nitrogen atoms of the triazole ring, and B represents a phenyl radical having a free hydroxyl group in the 2-position with regard to the linkage with the triazole ring and which can be further substituted in other positions, in particular by lower alkyl, lower alkoxy, lower carbalkoxy, cyclohexyl, phenyl groups and halogen. Compounds containing such substituents in the 5-position are advantageous.

Particularly valuable sub-classes of non-actinic agents according to the present invention (actively UV-absorbing compounds) are compounds having a free hydroxyl group in the 2-position with regard to the linkage with the triazole ring and which are substituted in the 3- and 5- or in the 4- and 5-positions by lower alkyl and chlorine.

In order to attain the absorption necessary for cosmetic purposes (absorption of UV rays up to 320 m$\mu$ causing erythema but non-absorption of sun-tanning rays about 350 m$\mu$ it is particularly advantageous if B represents a phenyl radical having in the o-position a substituent R (R being an alkyl, aralkyl, aryl, acyloxy, alkoxy or aralkoxy radical, preferably lower alkyl, lower alkoxy and acyloxy radicals). This phenyl radical can also be substituted in further positions as defined, in particular by hydrocarbon radicals such as, e.g., lower alkyl, hydroxyl groups or halogen.

In particular compounds which contain a lower alkoxy or acyloxy or a lower alkyl group in the 2-position with regard to the linkage with the triazole ring or which contain hydrogen, chlorine or lower alkyl in the 5-position or an OH group in the 4-position, both with regard to the linkage to the triazole ring, are of particular interest.

Halogens such as, e.g., fluorine, chlorine, bromine; alkyl groups such as methyl, ethyl, butyl, amyl, octyl, dodecyl groups; substituted alkyl groups such as the trifluoromethyl group; alicyclic groups such as the cyclohexyl group, methyl cyclohexyl groups or such as the 1.2-polymethylene groups, e.g., the $\alpha.\beta$-tetramethylene group; aralkyl groups such as the benzyl group, alkyl or alkoxy or halogen benzyl groups; aryl groups such as phenyl or alkoxyphenyl groups; R—O-groups wherein R represents hydrogen, an alkyl radical, aralkyl radical such as benzyl, an aryl radical such as phenyl, chlorophenyl or alkylphenyl radical; carbacyl groups such as an alkyl carbonyl, arylcarbonyl or alkoxycarbonyl radical; R—CO-groups wherein R represents hydrogen, an alkyl radical, an aralkyl radical such as benzyl, an aryl radical such as phenyl or chlorophenyl radical; a hydroxyl group, an alkoxy or an aryloxy group, an amino radical, an organically substituted amino radical, e.g., a monoalkyl, monocycloalkyl, monoaralkyl or monophenylamino group, a dialkylamino group, dicycloalkylamino group, diaralkylamino group, alkylaralkylamino group or alkylphenylamino group; R—SO$_2$- groups in which R represents a hydroxyl group, an alkyl radical, aralkyl radical such as benzyl, aryl radical such as phenyl, alkyl phenyl or alkoxy phenyl radical, an amino group such as H$_2$N-, an organically substituted amino group such as, e.g., a monoalkyl, monocycloalkyl, monoaralkyl, monophenyl, dialkylamino group, diaralkyl amino groups such as dibenzyl amino group, dicycloalkyl amino groups such as dicyclohexylamino group, alkylaralkyl amino groups such as alkylbenzyl amino groups and an alkylaryl amino group such as alkylphenyl amino groups, can be used as substituents of the aromatic rings, in particular of the radicals A and B.

All these groups are bound to the rings A and B by carbon, oxygen or sulphur atoms. If aromatic radicals are substituents or are in substituents, they can be substituted as A or B. Aromatic radicals should be bound to A or B either direct as in diphenyl derivatives or by means of saturated divalent bridging members not having dyeing characteristics. Examples of such bridging members are saturated hydrocarbon radicals, oxygen or sulphur ether atoms, carbonyl, sulphoxide, sulphonyl, disulphimide, carboxyl-sulphimide groups.

The compounds according to the present invention are produced by coupling aryldiazonium compounds with azo components of the benzene and naphthalene series coupling in the o-position to a primary amino group, which azo components may also be further substituted as defined, and oxidising the o-aminoazo dyestuffs thus formed to the corresponding 1.2.3-triazole compound. They can also be produced by coupling o-nitro aryl diazonium compounds of the benzene or naphthalene series with phenols or naphthols coupling in the o- or p-positions or with amines of the benzene and naphthalene series coupling in the p-positions to a primary amino group, and then reducing the o-nitro-azo dyestuffs by the usual methods, e.g., with ammonium sulphide or with zinc in an alkaline medium to form the 1.2.3-triazole compounds. In these processes also the aromatic rings can be further substituted as defined. In the end product free hydroxyl groups can also be alkylated or acylated. Primary amino groups must be removed by diazotising them and replacing the diazo group, by the usual methods, by for example, hydrogen, halogen or cyano or hydroxyl groups.

The triazole compounds according to the present invention are incorporated into the material to be protected from UV rays or into the protective foils and coverings in amounts varying from fractions of percentages to several percent. The protected material or protective coverings can contain, for example 0.001% to 15% of the active ingredient and should contain, advantageously 0.01% to 5.0%. In non-actinic agents for the human skin, the content of active ingredient should be advantageously 0.1–10% calculated on the non-volatile components of the preparation.

It is known that of substances suggested as non-actinic agents in the literature, only the o-hydroxybenzophenones have been used to a certain extent in technics because their properties more or less meet the very high requirements. In the same technical application, the triazole compounds used according to the present invention have the following advantages over the known products: having similar fastness to light, their absorption of the ultra-violet light is much stronger or, having similar absorption of UV-light, they are much more fast to light.

By a suitable choice of substituents, compounds can also be found amongst the non-actinic agents according to the present invention which can be used as skin-protecting agents. They prevent erythema occurring but do not prevent tanning.

The favourable effects according to the present invention are astonishing in view of the fact that the fastness to light of the [4.5-arylo-1.2.3-triazinyl] compounds of the stilbene and p-phenylene series which have a strong fluorescence in daylight and up to now have been used as optical brightening agents in the textile industry is one order of magnitude lower. These compounds are therefore less suitable as non-actinic agents for technical purposes.

In this description the expressions "non-actinic compounds" and "UV-absorbing compounds" are regarded as equivalent.

The following examples illustrate the present invention. Parts are given as parts by weight and the temperatures are in degrees centigrade.

EXAMPLE 1

Cellulose acetate foils are produced by dissolving 15.0 parts of acetyl cellulose (2.5 of the 3 OH groups per glucose unit esterified with acetic acid), 0.3 part of one of the non-actinic agents given in the following Tables 1(a) and 1(b) and 2.0 parts of dibutyl phthalate in 82.7 parts of acetone and drawing a film from this solution on to glass. The foils which are first dried at room temperature and then in the oven at 60° are 0.04 mm. thick. Samples thereof are exposed to light for 1000 hours in the fade-o-meter and then tested for brittleness by folding. The results are summarised in the following table:

*Table 1(a)*

| No. | Non-actinic agent | Behaviour of foil on folding | |
|---|---|---|---|
| | | Before exposure | After exposure for 1,000 h. |
| I | 2-(2'-hydroxy-5'-methylphenyl)-benzotriazole. | Unchanged | Unchanged. |
| II | 2-(2'-hydroxy-5'-methylphenyl)-benzotriazole-5-carboxylic acid butyl ester. | do | Do. |
| III | 2-(2'-hydroxy-5'-tert.butyl-phenyl-5-chlorobenzotriazole. | do | Do. |
| IV | 2-(2'-hydroxy-5'-amylphenyl) benzotriazole. | do | Do. |
| V | 2-(2'-hydroxy-5'-tert.butylphenyl) benzotriazole. | do | Do. |
| 0 | Blind test without non-actinic agent. | do | Split. |

The reason for the activity of the triazole compounds claimed according to the present invention probably lies in their capability to absorb ultra-violet light, as can be seen from the following:

The ultra-violet transmission is determined with light of 350–380 mμ. This transmission is measured in percent in the following Table 1(b):

*Table 1(b)*

| No. | Non-actinic agent | Percent transmission in light of 350-380 mμ | |
|---|---|---|---|
| | | Unexposed | After 1,000 h. |
| I | 2-(2'-hydroxy-5'-methylphenyl)-benzotriazole. | About 1 | About 1. |
| II | 2-(2'-hydroxy-5'-methylphenyl)-benzotriazole-5-carboxylic acid butyl ester. | do | Do. |
| III | 2-(2'-hydroxy-5'-tert.butyl-phenyl)-5-chlorobenzotriazole. | do | Do. |
| IV | 2-(2'-hydroxy-5'-amylphenyl)-benzotriazole. | do | Do. |
| V | 2-(2'-hydroxy-5'-tert.butyl-phenyl)-benzotriazole. | do | Do. |
| VI | Resbenzophenone (2.4-dihydroxy-benzophenone). | 23 | 35. |
| 0 | Blind test | 97 | 97. |

Table 1(b) shows that the triazole compounds used according to the present invention more completely absorb the ultra-violet rays also after longer exposure than Resbenzophenone, a light stabiliser much used in technics. They are considerably more fast to light.

EXAMPLE 2

Foils are produced as in Example 1 but instead of acetyl cellulose, a cellulose ester containing 0.5 benzoyl groups and 2.1 acetyl groups per glucose unit is used.

The foils were tested for folding and transmission of UV light and the results given in the following table were obtained:

*Table 2*

| No. | Non-actinic agent | Behaviour of film on folding | | Percent transmission with light of 350-380 mμ | |
|---|---|---|---|---|---|
| | | Before exposure | After 1,000 h. exposure | Before exposure | After 1,000 h. exposure |
| I | 2-(2'-hydroxy-3'.5'-dimethyl-phenyl)-benzotriazole. | Unchanged | Unchanged | About 1 | About 1. |
| II | 2-(2'-hydroxy-3'.5'-dimethyl-phenyl)-5-methoxy-benzotriazole. | do | do | do | Do. |
| III | 2-(2'-hydroxy-3'.5'-dimethyl-phenyl)-5-methyl-benzotriazole. | do | do | do | Do. |
| IV | 2-(2'-hydroxy-5'-carbethoxy-phenyl)-benzotriazole. | do | do | 35 | 39. |
| 0 | Blind test | do | Split | 98 | 97. |

The table shows that the UV part of the light is absorbed practically unchanged by the triazole compounds used according to the present invention, also after longer exposure.

EXAMPLE 3

The usual marketed polyester (IC.–312, Standard Polyester of the Interchemical Corporation, New York), such as is used for the production of polyester resin plates and which does not contain a light stabiliser is polymerised, after incorporation of 0.1% of the non-actinic agents according to the present invention given below, the polymerisation being performed at a raised temperature with the help of 1% of benzoyl peroxide, into 4 mm. thick, optically clear plates. Samples of the plates are exposed for 1000 hours in the fade-o-meter, after which time the light transmittancy is determined. Table 3 shows the results obtained:

Table 3

| No. | Non-actinic agent | Percent transmission with light of 440 mµ | |
|---|---|---|---|
| | | Before exposure | After 1,000 h. exposure |
| I | Without non-actinic agent | 84 | 69 |
| II | 2-(2'-hydroxy-5'-methyl-phenyl)-benzotriazole. | 84 | 80 |
| III | 2-(2'-hydroxy-5'-tert.butyl-phenyl)-benzotriazole. | 84 | 79 |
| IV | 2-(2'-hydroxy-5'-tert.butyl-phenyl)-5-chlorobenzotriazole. | 86 | 84 |
| V | 2-(2'-hydroxy-3'-methyl-5'-tert.-butyl-phenyl)-benzotriazole. | 85 | 82 |

Instead of the compounds given in Table 3, also the following substances can be used with similar results. They are distinguished by the wave length of the absorption maximum having the longest wave length. The spectrum is taken in methyl alcohol:

Mµ
(1) 2-(2'-hydroxy-5'-methoxy-phenyl)-benzotriazole _____ 350
(2) 2-(2'-hydroxy-5'-methyl-phenyl-)5.6-dichlorobenzotriazole _____ 342
(3) 2-(2'-hydroxy-5'-phenyl-phenyl)-5-chlorobenzotriazole _____ 342
(4) 2-(2'-hydroxy-5'-cyclohexyl-phenyl-5-chlorobenzotriazole _____ 341
(5) 2-(2'-hydroxy-5'-cyclohexyl-phenyl)-benzotriazole _____ 338
(6) 2-(2'-hydroxy-4'.5'-dimethyl-phenyl)-benzotriazole-5-carboxylic acid butyl ester _____ 347
(7) 2-(2'-hydroxy-3'.5'-dichlorophenyl)-benzotriazole _____ 335
(8) 2-(2'-hydroxy-4'.5'-dichlorophenyl)-benzotriazole _____ 334
(9) 2-(2'-hydroxy-5'-methyl-phenyl)-benzotriazole-5-ethylsulphone _____ 350
(10) 2-(2'-hydroxy-3'.5'-dimethyl-phenyl)-benzotriazole-5-ethylsulphone _____ 351
(11) 2-(2'-hydroxy-5'-phenyl-phenyl)-benzotriazole _____ 340
(12) 2-(2'-hydroxy-5'-methoxy-phenyl)-5-methylbenzotriazole _____ 350

EXAMPLE 4

Foils from a mixture consisting of:

66 parts of polyvinyl chloride pulverised,
33 parts of dioctyl phthalate,
1 part of non-actinic agent are produced on a roller frame at 150°. Samples of these foils are exposed for 720 hours in the fade-o-meter. The results given in Table 4 are obtained:

Table 4

| No. | Non-actinic agent | Appearance of the foils after exposure |
|---|---|---|
| 0 | Blind test | Decomposed. |
| I | 2-(2'-hydroxy-5'-methyl-phenyl), benzotriazole. | A few brown spots. |
| II | 2-(2'-hydroxy-5'-methyl-phenyl)-benzotriazole-5-carboxylic acid hexyl ester. | Unchanged. |
| III | 2-(2'-hydroxy-5'-tert. butyl-phenyl)-benzotriazole. | A few brown spots. |
| IV | 2-(2'-hydroxy-5'-tert. butyl-phenyl)-5-chlorobenzotriazole. | Unchanged. |

EXAMPLE 5

A non-actinic preparation for the human skin which prevents erythema but allows tanning is obtained as follows:

5 parts of white ceresin wax,
22 parts of white petrolatum,
19.5 parts of white mineral oil,
15 parts of lanolin, anhydrous,
2 parts of a compound named in Table 5,
36 parts of water and,
0.5 part of perfume.

The non-actinic preparation is produced by first melting the ceresin, petrolatum and the lanolin together and dispersing one of the benzotriazole derivatives mentioned in the following Table 5 in the melt. Mineral oil is then added at 70° and water is then slowly introduced at the same temperature. Stirring is continued until the temperature has dropped at 50° whereupon the perfume is added.

The amounts of 0.1 to 7 parts of non-actinic agent can be used in the composition depending entirely on the intended use, for example at high altitudes, on the beach etc.

Table 5

| No. | Non-actinic agent | Maximum of absorption band having longest wavelength at mu |
|---|---|---|
| 1 | 2-(2'-acetoxy-5'-methylphenyl)-5-methylbenzotriazole. | 304 |
| 2 | 2-(2'-acetoxy-5'-methylphenyl)-benzotriazole. | 300 |
| 3 | 2-(2'-stearoyloxy-5'-methylphenyl)-benzotriazole. | 300 |
| 4 | 2-(2'-benzoyloxy-5'-methylphenyl)-benzotriazole. | 300 |
| 5 | 2-(2'-p-tosyloxy-5'-methylphenyl)-benzotriazole. | 298 |
| 6 | 2-(2'-methyl-4'-hydroxyphenyl)-benzotriazole. | 294 |
| 7 | 2-(2'-methoxy-5'-methylphenyl)-benzotriazole. | 289 |
| 8 | 2-(2'-methoxy-5'-chlorophenyl)-benzotriazole. | 288 |

EXAMPLE 6

A non-actinic preparation for the human skin which can be sprayed is obtained if 10 parts of ricinoleic acid methyl ester, 10 parts of oleyl alcohol and 1 part of 2-(2'.6'-dimethyl-4'-hydroxyphenyl)-benzotriazole are dissolved in 80 parts of ethanol. After the addition of the usual marketed Freon propellants, the solution can be sprayed from an aerosol. It protects the skin from erythema without preventing tanning by the sun.

What is claimed is:
1. An ultraviolet light-absorbing compound, capable of protecting materials sensitive to ultraviolet light, of the formula

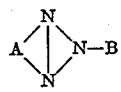

wherein A is an o-phenylene group bound by two neighbouring carbon atoms to two nitrogen atoms of the triazole ring, said o-phenylene group being selected from the group consisting of unsubstituted o-phenylene, o-phenylene carboxylic acid(lower)alkyl ester, ethyl sulphonyl-o-phenylene, chloro-o-phenylene, lower alkoxy-o-phenylene, and lower alkyl-o-phenylene, and B is 2-hydroxyphenyl substituted by a member selected from the group consisting of lower alkyl, lower alkoxy, lower carbalkoxy, cyclohexyl, phenyl and chlorine.

2. 2-(2'-hydroxy-5'-methyl-phenyl)-benztriazole.
3. 2-(2'-hydroxy-5'-tert. butyl-phenyl)-benztriazole.
4. 2-(2'-hydroxy-5'-cyclohexyl-phenyl)-benztriazole.
5. 2-(2'-hydroxy-3'-methyl-5'-tert. butyl-phenyl)-benztriazole.

6. 2 - (2'-hydroxy-5'-tert. butyl-phenyl) - 5 - chloro-benztriazole.

7. 2-(2'-hydroxy-4',5'-dichloro-phenyl)-benztriazole.

8. 2 - (2'-hydroxy-5'-methyl-phenyl) - 5,6 - dichloro-benztriazole.

References Cited by the Examiner

UNITED STATES PATENTS

| 1,975,383 | 10/34 | Zitscher | 260—308 |
| 2,362,988 | 11/44 | Conzetti et al. | 260—308 |
| 2,666,062 | 1/54 | Brunner et al. | 260—308 |
| 2,784,183 | 3/57 | Keller et al. | 260—308 |
| 2,867,624 | 1/59 | Anderson | 260—308 |
| 3,055,896 | 9/62 | Boyle et al. | 260—308 |
| 3,072,585 | 1/63 | Milionis et al. | 260—308 |
| 3,074,910 | 1/63 | Dickson | 260—308 |

OTHER REFERENCES

Beilsteins Handbuch der Organischen Chemie, vol. 26 (Berlin, 1954), Second Supplement, pages 18–22.

Benson et al., Chemical Reviews, vol. 46, page 39 (1950).

Chakrabarty, Chemical Abstracts, vol. 23, page 836 (1929).

Elbs et al., Chemical Abstracts, vol. 19, pages 514–5 (1925).

Itomi, Chem. Abstracts, vol. 24, pages 2060–1 (1930).

Karrer, Organic Chemistry (New York, 1946), page 474.

NICHOLAS S. RIZZO, *Primary Examiner.*

DUVAL T. McCUTCHEN, WALTER A. MODANCE, *Examiners.*

Disclaimer

3,189,615.—*Hansjorg Heller*, Basel, *Ernst Keller*, Basel-Land, and *Hermann Gysling*, Basel, Switzerland, and *Fritz Mindermann*, Baden, Germany. 2-ARYL-4,5-ARYLO-1,2,3-TRIAZOLE. Patent dated June 15, 1965. Disclaimer filed Dec. 3, 1975, by the assignee, *H. A. Whitten & Co.*

Hereby enters this disclaimer to claims 1 through 8, inclusive, of said patent.

[*Official Gazette March 16, 1976.*]